(12) United States Patent
Vandervort et al.

(10) Patent No.: US 11,788,621 B2
(45) Date of Patent: Oct. 17, 2023

(54) PISTON ASSEMBLY FORMED OF INTERLOCKING PISTON MEMBERS

(71) Applicant: AMERICAN AXLE & MANUFACTURING, INC., Detroit, MI (US)

(72) Inventors: Michael J. Vandervort, Reynoldsville, PA (US); Raymond J. Clark, Jr., Brockport, PA (US); Joshua J. Shelander, St Marys, PA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/972,042

(22) Filed: Oct. 24, 2022

(65) Prior Publication Data
US 2023/0144321 A1    May 11, 2023

Related U.S. Application Data

(60) Provisional application No. 63/263,830, filed on Nov. 10, 2021.

(51) Int. Cl.
| | |
|---|---|
| *F16F 9/32* | (2006.01) |
| *F16J 1/00* | (2006.01) |
| *F16F 9/34* | (2006.01) |

(52) U.S. Cl.
CPC ............ *F16J 1/005* (2013.01); *F16F 9/3214* (2013.01); *F16F 9/3405* (2013.01)

(58) Field of Classification Search
CPC ............................ F16F 9/3214; F16F 9/3405
USPC ................. 92/255; 188/322.15, 282.5, 282.6
See application file for complete search history.

(56) References Cited

U.S. PATENT DOCUMENTS

| | | | | |
|---|---|---|---|---|
| 5,579,874 A * | 12/1996 | Jeffries | .................... | F16F 9/516 267/64.11 |
| 6,397,987 B1 * | 6/2002 | Pesch | .................... | F16F 9/3214 188/322.18 |
| 6,634,379 B2 | 10/2003 | Asadi et al. | | |
| 7,703,586 B2 * | 4/2010 | Deferme | ............... | F16F 9/5126 188/282.5 |
| 8,025,135 B1 * | 9/2011 | Lu | ............................ | F16F 9/585 188/282.5 |
| 8,752,682 B2 * | 6/2014 | Park | ....................... | F16F 9/3481 188/322.22 |
| 9,074,650 B2 | 7/2015 | Park et al. | | |
| 9,353,860 B2 * | 5/2016 | Frey | ........................ | F16J 1/005 |

(Continued)

FOREIGN PATENT DOCUMENTS

EP        0557548 A1 *    9/1993

*Primary Examiner* — Thomas E Lazo
(74) *Attorney, Agent, or Firm* — Reising Ethington P.C.

(57) ABSTRACT

A piston assembly that includes a pair of piston members that are formed of compacted powdered metal. The piston members have sets of locking features that include alternating projections and recesses that are spaced circumferentially about and intersect a rod aperture that extends through the piston member. Each projection is formed along a projection axis, which extends radially from a center axis along which the rod aperture is formed, and has a pair of opposite side walls and an end wall that connects the side walls to one another on a side of the projection that is opposite the rod aperture. The recesses on each piston member are configured to matingly and frictionally receive the projections on the other piston member.

12 Claims, 4 Drawing Sheets

(56) References Cited

U.S. PATENT DOCUMENTS

| | | |
|---|---|---|
| 9,915,315 B2 | 3/2018 | Frey et al. |
| 10,851,813 B2 | 12/2020 | Odaka |
| 2003/0127294 A1* | 7/2003 | Moradmand ........... F16F 9/466 188/282.5 |
| 2009/0000891 A1* | 1/2009 | Kouyama ............. F16F 9/3484 188/322.15 |
| 2009/0260938 A1* | 10/2009 | Hikosaka .............. F16F 9/3484 188/322.15 |
| 2013/0305919 A1* | 11/2013 | Frey ...................... F16F 9/3405 29/888.044 |
| 2017/0016506 A1* | 1/2017 | Senou ....................... F16F 9/32 |

* cited by examiner

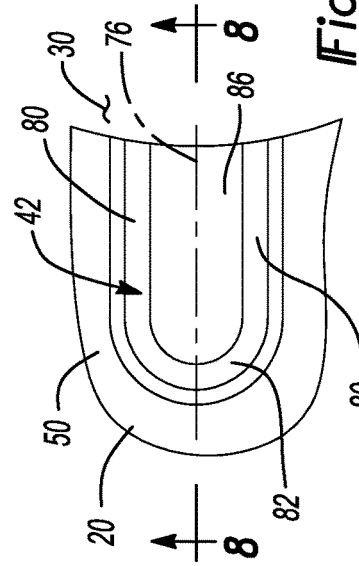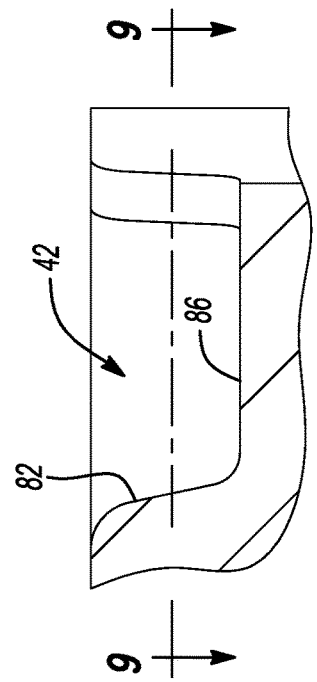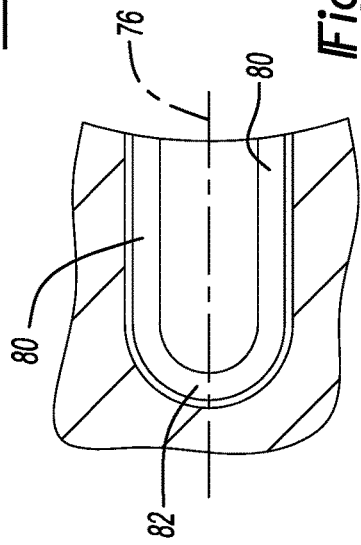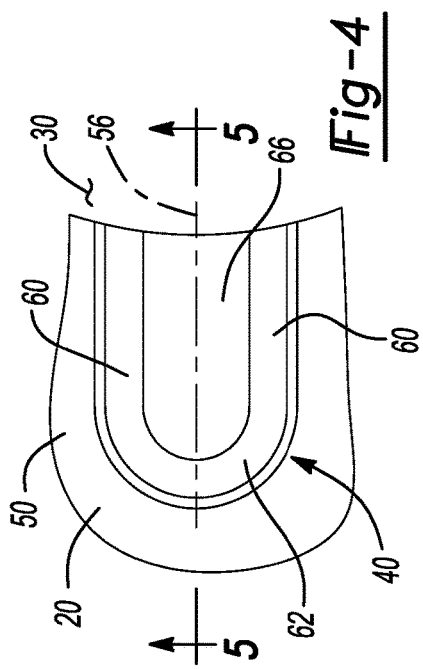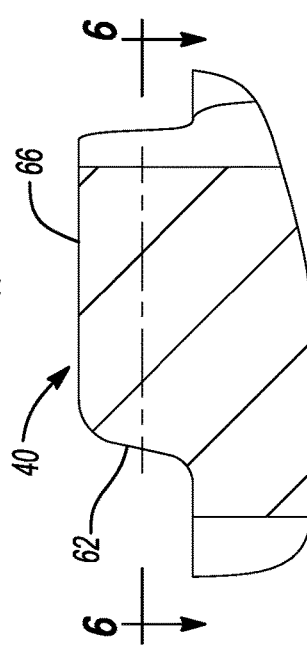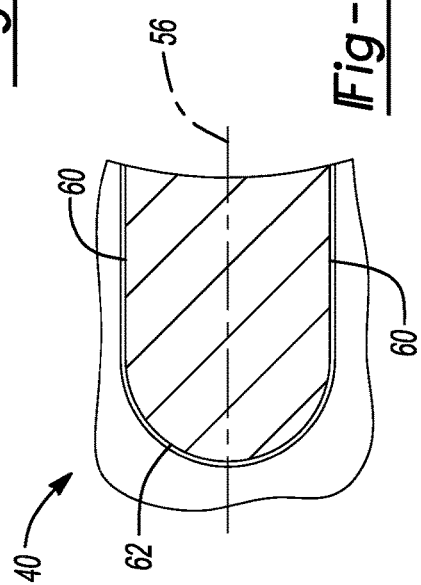

PISTON ASSEMBLY FORMED OF INTERLOCKING PISTON MEMBERS

CROSS-REFERENCE TO RELATED APPLICATIONS

This application claims the benefit of U.S. Provisional Application No. 63/263,830 filed Nov. 10, 2021, the disclosure of which is incorporated by reference as if fully set forth in detail herein.

FIELD

The present disclosure relates to a piston assembly, such as that used in an automotive shock absorber, that is formed of interlocking piston members.

BACKGROUND

It is known in the field of automotive shock absorbers to form a piston for the shock absorber from multiple piston members, where each piston member is formed of compacted powdered metal. It is known to form a series of relatively short cylindrical projections and relatively shallow cylindrical holes on the abutting surfaces of the piston members that mate with one another to control both the orientation of one piston member relative to the other, as well as to provide a modicum of frictional engagement that tends to resist the separation of the piston members from one another. This configuration, however, has several drawbacks.

For example, the piston members must be sintered while resting on an axial end surface of the piston member rather than on the short cylindrical projections as the relatively small diameter projections have a propensity to break off if the piston member is sintered while resting on the short cylindrical projections. Sintering the piston member while it rests on its axial end surface may not be desirable in situations where that surface could become damaged during the sintering operation. Additionally, the retention force that is provided through the mating of relatively short cylindrical projections with relatively shallow cylindrical holes is relatively small and relatively inconsistent.

Accordingly, there remains a need in the art for a multi-piece compacted powered metal piston assembly that employs a more robust locking system for securing adjacent compacted powdered metal components to one another.

SUMMARY

This section provides a general summary of the disclosure, and is not a comprehensive disclosure of its full scope or all of its features.

In one form, the present disclosure provides a piston assembly that includes a pair of piston members. Each of the piston members has a central hub, an outer rim, a plurality of vent apertures and a set of locking features. The central hub defines a rod aperture. The outer rim is disposed concentrically about the central hub. The vent apertures are disposed radially between the outer rim and the central hub. The set of locking features includes a plurality of projections and a plurality of recesses. The projections extend from an axial end surface of the central hub and are spaced apart from one another about the rod aperture. Each of the projections is formed along a projection axis that extends radially from a center axis along which the rod aperture is formed. Each of the projections intersects the rod aperture. Each of the projections has a pair of opposite side walls and an end wall that connects the side walls to one another on a side of the projection that is opposite the rod aperture. The recesses extend through the axial end surface and into of the central hub and are spaced apart from one another about the rod aperture. Each of the recesses is formed along a recess axis that extends radially from the center axis. Each of the recesses intersects the rod aperture. Each of the recesses has a pair of opposite side walls and an end wall that connects the side walls of the recess to one another on a side of the recess that is opposite the rod aperture. The projections on each piston member are received into and are frictionally engaged with a corresponding one of the recesses that is formed on the other piston member to thereby secure the piston members to one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an enlarged portion of FIG. 3 illustrating a projection of a set of locking features;

FIG. 5 is a section view taken along the line 5-5 of FIG. 4;

FIG. 6 is a section view taken along the line 6-6 of FIG. 5;

FIG. 7 is an enlarged portion of FIG. 3 illustrating a recess of the set of locking features;

FIG. 8 is a section view taken along the line 8-8 of FIG. 7; and

FIG. 9 is a section view taken along the line 9-9 of FIG. 8.

Corresponding reference numerals indicate corresponding parts throughout the several views of the drawings.

DETAILED DESCRIPTION

Figure 1:
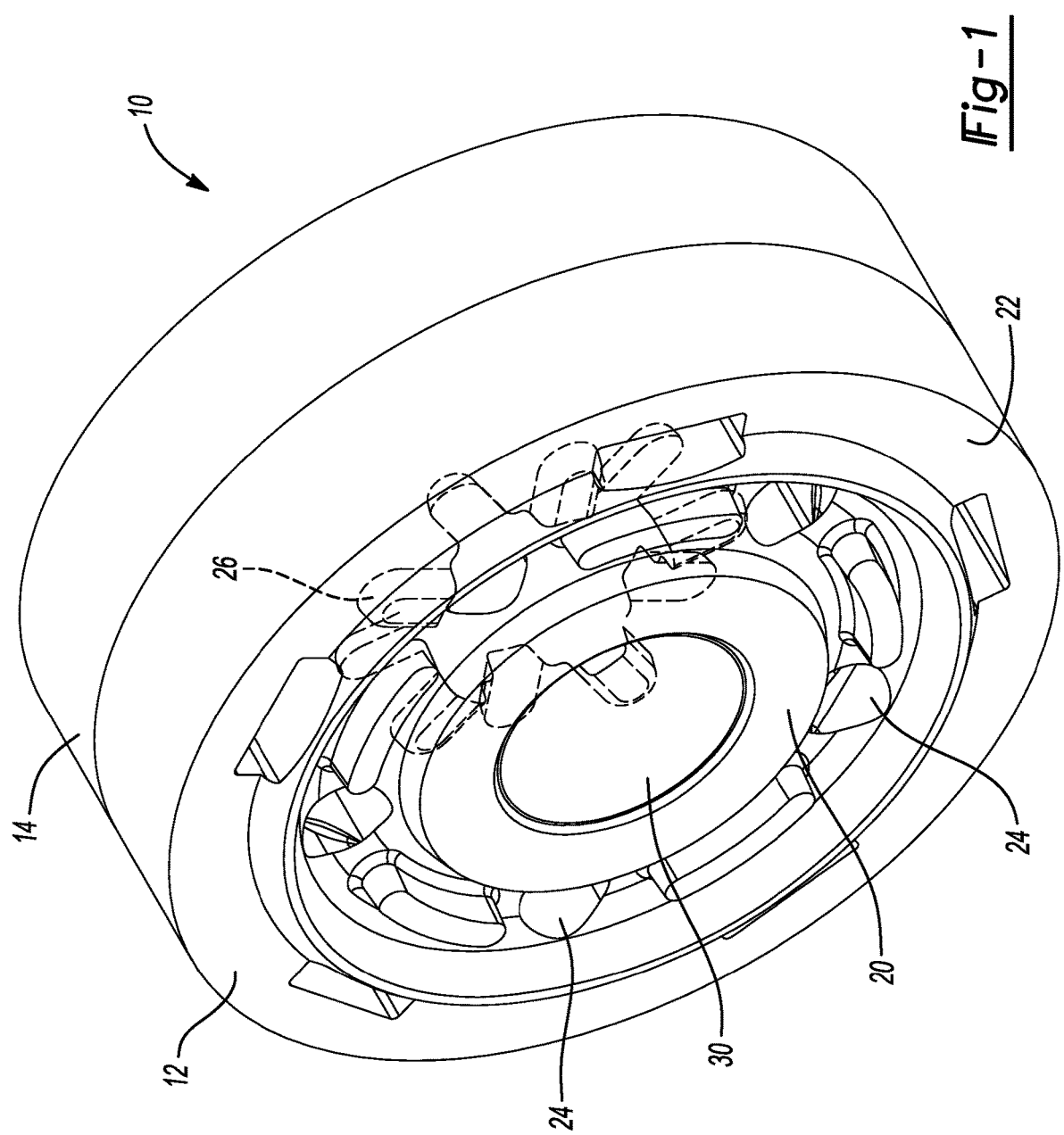
FIG. 1 is a perspective view of an exemplary piston assembly constructed in accordance with the teachings of the present disclosure.
Figure 2:
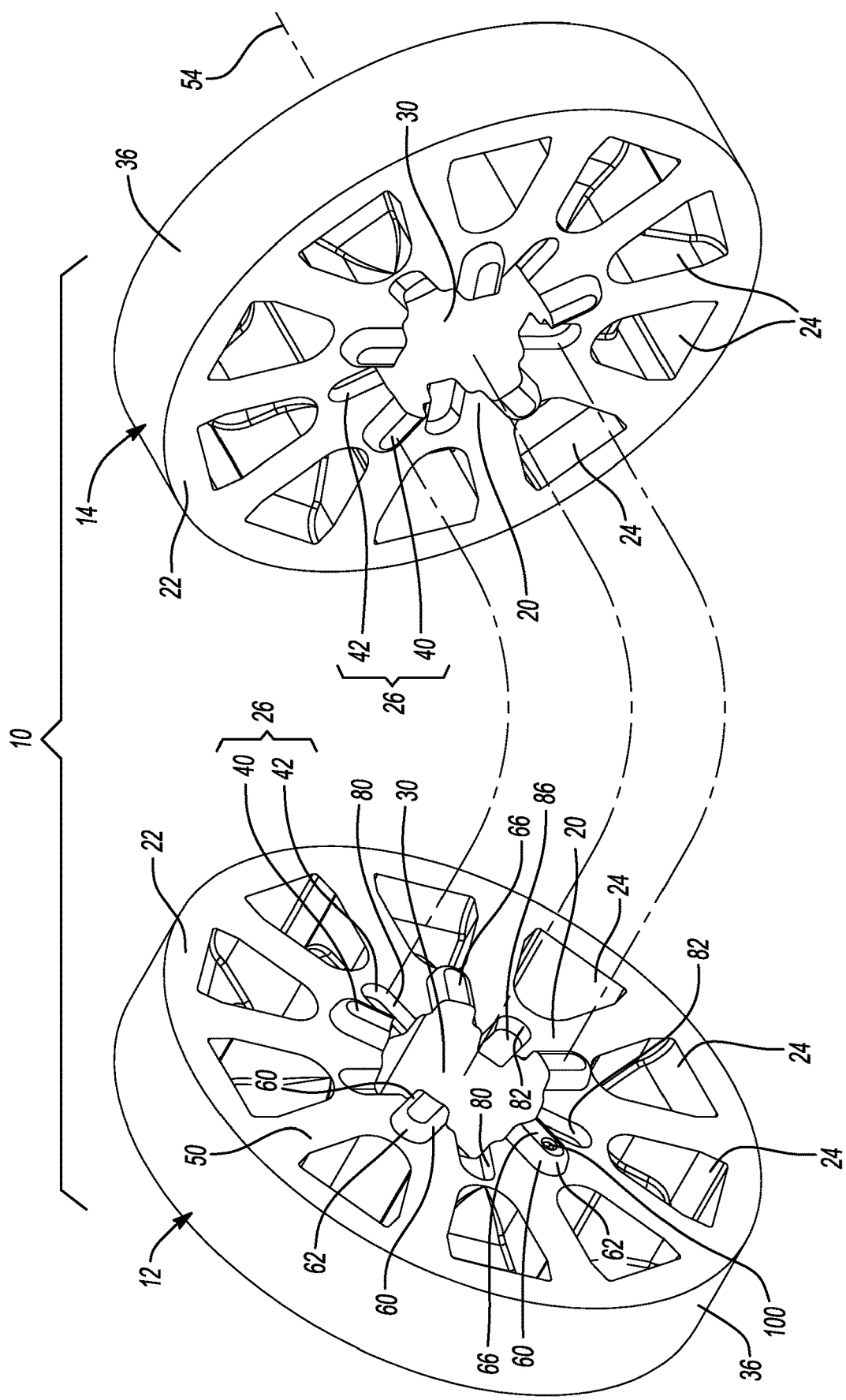
FIG. 2 is an exploded perspective view of the piston assembly of FIG. 1 showing a pair of mating piston members.

With reference to FIGS. 1 and 2, a piston assembly constructed in accordance with the teachings of the present disclosure is generally indicated by reference numeral 10. The piston assembly 10 includes first and second piston members 12 and 14, respectively, that are each formed of a compacted powdered metal material. In the example provided, the first and second piston members 12 and 14 are identical in their configuration and as such, only the first piston member 12 will be discussed in detail. In view of this similarity, reference numerals used to identify elements or features of the first piston member 12 will also be used herein in references to those elements or features on the second piston member 14. It will be appreciated that the first and second piston members 12 and 14 need not be configured in an identical manner, and that the piston assembly 10 could include more than two piston members.

Figure 3:
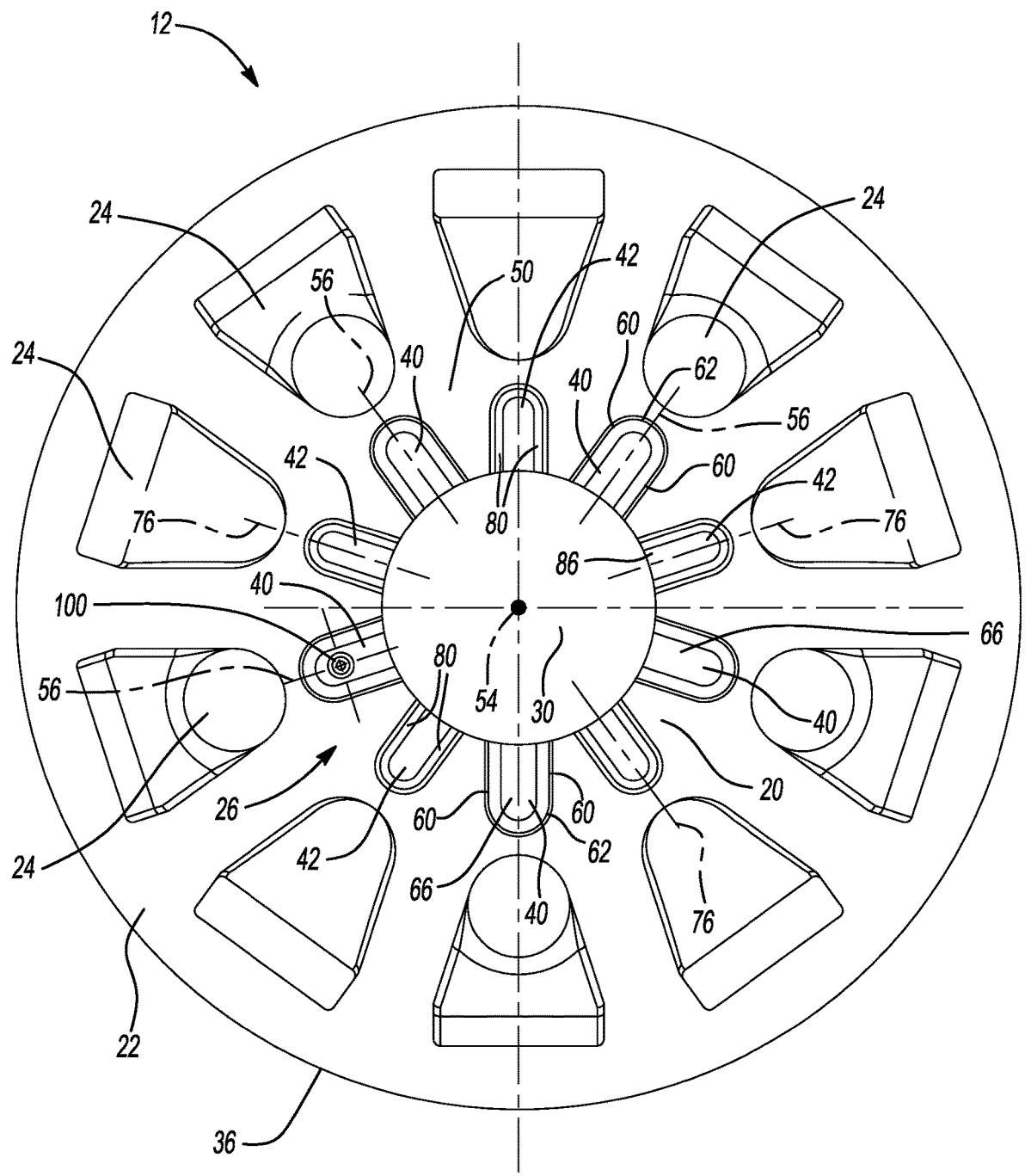
FIG. 3 is a top plan view of a portion of the piston assembly of FIG. 1 illustrating one of the piston members in more detail.

With reference to FIGS. 2 and 3, the first piston member 12 can be generally shaped as a right cylindrical plynth and can define a central hub 20, an outer rim 22, a plurality of vent apertures 24, and set of locking features 26. The central hub 20 can define a rod aperture 30 that is configured to receive a rod (not shown) therethrough. The outer rim 22 is disposed concentrically about the central hub 20. The outside diametrical surface 36 of the outer rim 22 is cylindrically shaped in the example provided, but could optionally be configured in a contoured manner to engage a circumferentially extending seal (not shown). The vent apertures 24 are disposed about the circumference of the first piston member 12 in a desired manner, such as concentrically about the central hub 20. The configuration of the vent apertures 24 is not germane to this discussion and as such, a detailed description of the vent apertures 24 will not be provided herein. In brief, the vent apertures 24 are configured to aid in the flow of fluid through the piston assembly 10.

The set of locking features 26 includes a plurality of projections 40 and a plurality of recesses 42 that are formed on the central hub 20 and intersect the rod aperture 30. The projections 40 are spaced apart from one another about the central hub 20 and extend from an axial end surface 50 of the central hub 20. The recesses 42 are spaced apart from one another about the central hub 20 and extend into the central hub 20 from the axial end surface 50 of the central hub 20. In the example provided, the quantity of recesses 42 is equal to the quantity of projections 40 and each of the recesses 42 is disposed between an adjacent pair of the projections 40. It will be appreciated, however, that that the quantities of the projections 40 and the recesses 42 can be different from one another. It will also be appreciated that the projections 40 and/or the recesses 42 need not be disposed about the central hub 20 in a symmetric manner, which may be desirable in a situation where the first and second piston members 12 and 14 must be assembled to one another in a single orientation.

With reference to FIGS. 3 through 6, in a cross-section of a projection 40 taken perpendicular to the center axis 54 of the rod aperture 30, the projection 40 can be formed symmetrically about a projection axis 56 that extends radially from the center axis 54 of the rod aperture 30 and can be shaped as a portion of a stadium, a discorectangle or obround. More specifically, the cross-sectional shape of the projection 40 can have a pair of sidewalls 60 and an end wall 62 that joins the sidewalls 60 to one another. In the plane of the cross-section, which is specifically shown in FIG. 6, the sidewalls 60 are depicted as parallel lines that are also parallel to the projection axis 56, while the end wall 62 would be depicted as being a half-circle that joins the sidewalls 60 together. In practice, the sidewalls 60 and the end wall 62 could be formed with draft (i.e., taper) to permit them to be more easily released from the tooling (not shown) that is employed to form the first piston member 12.

In the example shown, the radially inner end of the projection 40 conforms to the diameter of the rod aperture 30, but it will be appreciated that the radially inner end of the projection 40 can be formed differently. For example, the radially inner end of the projection 40 could be formed as a portion of a right frustum or cone whose axis is coincident with the center axis 54 of the rod aperture 30 and which diverges from the center axis 54 with increasing distance from the axial end surface 50 of the central hub 20. Configuration in this manner may be desirable to provide a modicum of clearance between the radially inner ends of the projections 40 and the rod (not shown) that is fitted through the rod aperture 30. A first fillet radius can be used where the sidewalls 60 and end wall 62 of each projection 40 intersects the axial end surface 50 of the central hub 20. A second fillet radius, or alternately a chamfer, can be used where the sidewalls 60 and end wall 62 intersect the end face 66 of their associated projection 40.

With reference to FIGS. 2 and 3, each of the recesses 42 can be configured to matingly receive a corresponding one of the projections 40 (i.e., the projections 40 formed on the second piston member 14) in a desired manner (i.e., with a desired engineering fit). For example, the recesses 42 can be configured to receive the projections 40 in an interference fit. The engineering fit that is employed between the recesses 42 and the projections 40 could be dependent in part on the process that is employed to form the piston assembly 10. In this regard, the first and second piston members 12 and 14 could be assembled to one another in a "green" condition (i.e., prior to sintering), with the intention that the first and second piston members 12 and 14 fuse together during the sintering operation. A brazing compound (not shown) could optionally be employed (e.g., on the abutting axial end surfaces 50 of the central hubs 20 of the first and second piston members 12 and 14, and/or on the sets of locking features 26) to secure (or further secure) the first and second piston members 12 and 14 to one another. In the particular example provided, the first and second piston members 12 and 14 undergo sintering before being assembled to one another.

With reference to FIGS. 3 and 7 through 9, in a cross-section of a recess 42 taken perpendicular to the center axis 54 of the rod aperture 30, the recess 42 can be formed symmetrically about a recess axis 76 that extends radially from the center axis 54 of the rod aperture 30 and can be shaped as a portion of a stadium, a discorectangle or obround. More specifically, the cross-sectional shape of the recess 42 can have a pair of parallel sidewalls 80 and an end wall 82. In the plane of the cross-section, the sidewalls 80 are depicted as parallel lines that are also parallel to the recess axis 76, while the end wall 82 is depicted as a half-circle that joins the sidewalls 80 to one another. In practice, the sidewalls 80 and the end wall 82 could be formed with draft (i.e., taper) to permit them to be more easily released from the tooling (not shown) that is employed to form the first piston member 12.

In the example shown, the radially inner end of the recess 42 conforms to the diameter of the rod aperture 30. A third fillet radius can be used where the sidewalls 80 and end wall 82 of each projection 40 intersects the axial end face 86 of their associated recess 42. A fourth fillet radius, or alternately a chamfer, can be used where the sidewalls 80 and end wall 82 intersect the axial end surface 50 of the central hub 20.

With reference to FIGS. 2 and 3, the projections 40 and recesses 42 of the set of locking features 26 on the first piston member 12 can be aligned to the recesses 42 and projections 40, respectively, on the second piston member 14. Optionally, one or more features on the first and second piston members 12 and 14 can be employed to orient them about the center axis 54 of the rod aperture 30 to thereby provide the desired alignment of the two sets of locking features 26. Features employed to orient the first and second piston members 12 and 14 to one another could comprise existing features formed thereon, such as the configuration of the vent apertures 24, and/or could comprise one or more features that are solely used to orient an associated one of the first and second piston members 12 and 14. Also optionally, one or more features could also be formed into each of the first and second piston members 12 and 14 to permit automated inspection (i.e., via a camera) of the first and second piston members 12 and 14 prior to their assembly to one another. In the example provided, a feature 100 that is formed as a dimple in the end face 66 of one of the projections 40. The feature 100 is employed in an automated inspection operation to verify the placement of the feature 100 in a desired orientation (or optionally, one of a plurality of desired orientations), which ensures that the projections 40 and recesses 42 are disposed in correct orientations.

With the projections 40 and the recesses 42 on the first piston member 12 being aligned to the recesses 42 and the projections 40 on the second piston member 14, the first and second piston members 12 and 14 can be pressed together along an axis that is coincident with the center axes 54 of the rod apertures 30 formed through the first and second piston members 12 and 14. When pressed together, the sidewalls 60 on the projections 40 on one of the first and second piston members 12 and 14 engage the corresponding sidewalls 80 of the recesses 42 on the other one of the first and second piston members 12 and 14, and vice versa. Optionally, the end walls 62 and 82 can also engage one another. If the first and second piston members 12 and 14 had not been sintered prior to their assembly to one another, the assembly can be sintered to complete the piston assembly 10.

The locking features 26 are advantageous over the prior art because the first and second piston members 12 and 14 are able to be sintered while resting on the protrusions 40. Consequently, the risk of an external surface of the first and second piston members 12 and 14 becoming damaged during the sintering process is greatly reduced. Additionally, the configuration of the locking features 26 permit the first piston member 12 to be assembled to the second piston member 14 in numerous positions, rendering the orienting step of the assembly process somewhat easier and contributing to a lower scrap rate due to an error in the orientation between the first and second piston members 12 and 14. Also additionally, the retention force that is provided by the locking features 26 is much more consistent than that of the prior art, and can be configured to be significantly higher than that which is provided by the prior art. In the example provided, the retention force provided by the locking features 26 is approximately three times that which was provided by the prior art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A piston assembly comprising:
a pair of piston members (12, 14), each piston (12, 14) member having a central hub (20), an outer rim (22), a plurality of vent apertures (24) and a set of locking features (26), the central hub (20) defining a rod aperture (30), the outer rim (22) being disposed concentrically about the central hub (20), the vent apertures (24) being disposed radially between the outer rim (22) and the central hub (20), the set of locking features (26) including a plurality of projections (40) and a plurality of recesses (42), the projections (40) extending from an axial end surface (50) of the central hub (20) and being spaced apart from one another about the rod aperture (30), each of the projections (40) being formed along a projection axis (56) that extends radially from a center axis (54) along which the rod aperture (30) is formed, each of the projections (40) intersecting the rod aperture (30), each of the projections (40) having a pair of opposite side walls (60) and an end wall (62) that connects the side walls (60) to one another on a side of the projection (40) that is opposite the rod aperture (30), the recesses (42) extending through the axial end surface (50) and into of the central hub (20) and being spaced apart from one another about the rod aperture (30), each of the recesses (42) being formed along a recess axis (76) that extends radially from the center axis (54), each of the recesses (42) intersecting the rod aperture (30), each of the recesses (42) having a pair of opposite side walls (80) and an end wall (82) that connects the side walls (80) of the recess to one another on a side of the recess (42) that is opposite the rod aperture (30), wherein the projections (40) on each piston member (12, 14) are received into and are frictionally engaged with a corresponding one of the recesses (42) formed on the other one of the piston members (12, 14) to thereby secure the piston members (12, 14) to one another.

2. The piston assembly of claim 1, wherein the side walls (60) of the projections (40) are tapered.

3. The piston assembly of claim 1, wherein the end walls (62) of the projections (40) are tapered.

4. The piston assembly of claim 1, wherein each of the projections (40) is shaped as a portion of a stadium, a discorectangle or an obround.

5. The piston assembly of claim 1, wherein the vent apertures (24) and the locking features (26) in the set of locking features (26) are equal in number.

6. The piston assembly of claim 5, wherein each of the locking features (26) is formed symmetrically about an axis (56, 76) that extends radially from the rod aperture (30) and wherein the axis (56, 76) of each of the locking features (26) is coincident with an axis of a corresponding one of the vent apertures (24).

7. The piston assembly of claim 1, wherein each recess (42) in one of the piston members (12, 14) is disposed between a pair of the projections (40).

8. The piston assembly of claim 1, wherein the locking features (26) are disposed symmetrically about the central hub (20).

9. The piston assembly of claim 1, wherein a brazing compound couples the piston members (12, 14) to one another.

10. The piston assembly of claim 1, wherein each piston member (12, 14) includes an inspection feature (100) that is configured to identify a predetermined location on the piston member (12, 14).

11. The piston assembly of claim 10, wherein the inspection feature (100) comprises a dimple that is formed into the end face (66) of one of the projections (40) on the piston member (12, 14).

12. The piston assembly of claim 1, wherein the end faces (66) of the projections (40) are parallel to the axial end surface (50) of the central hub (20).

* * * * *